No. 661,147. Patented Nov. 6, 1900.
W. A. HILL.
COUPLING FOR POLES OR THILLS.
(Application filed Sept. 12, 1900.)
(No Model.)
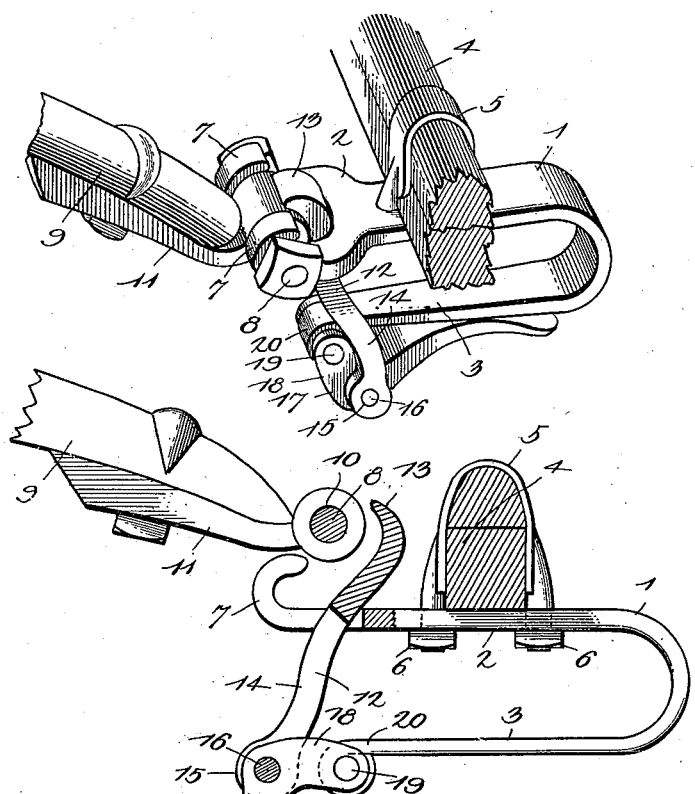
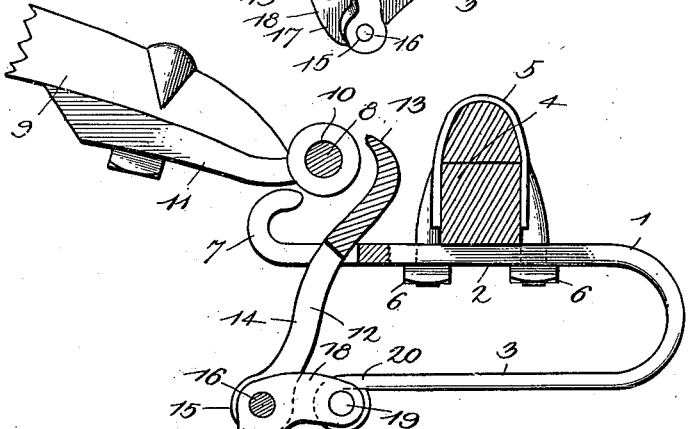
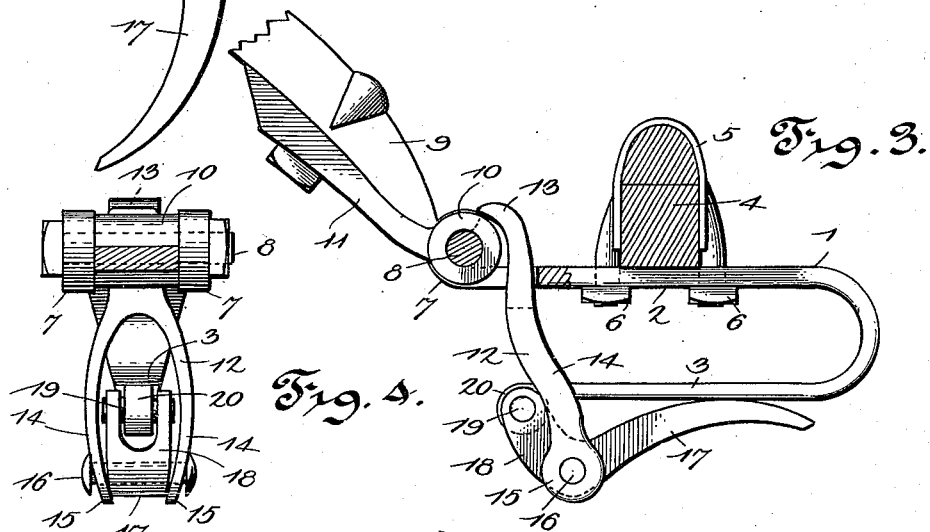
Witnesses
W. A. Hill, Inventor.
By C. A. Snow & Co.
Attorneys

UNITED STATES PATENT OFFICE.

WILLIAM A. HILL, OF URSA, ILLINOIS.

COUPLING FOR POLES OR THILLS.

SPECIFICATION forming part of Letters Patent No. 661,147, dated November 6, 1900.

Application filed September 12, 1900. Serial No. 29,789. (No model.)

*To all whom it may concern:*

Be it known that I, WILLIAM A. HILL, a citizen of the United States, residing at Ursa, in the county of Adams and State of Illinois, have invented a new and useful Coupling for Poles or Thills, of which the following is a specification.

The invention relates to improvements in couplings for poles and thills.

The object of the present invention is to improve the construction of couplings for thills and poles and to provide a simple, inexpensive, and efficient device adapted to be readily applied to vehicles without necessitating any alteration in the construction of their poles and thills and capable of enabling the same to be readily connected with and uncoupled from a vehicle and of effectually preventing the parts from rattling.

The invention consists in the construction and novel combination and arrangement of parts hereinafter fully described, illustrated in the accompanying drawings, and pointed out in the claims hereto appended.

In the drawings, Figure 1 is a perspective view of a thill-coupling constructed in accordance with this invention. Fig. 2 is a longitudinal sectional view, the parts being unlocked to permit the removal of the thill and its arrangement in the bearings of the device. Fig. 3 is a side elevation, the parts being locked. Fig. 4 is a transverse sectional view.

Like numerals of reference designate corresponding parts in all the figures of the drawings.

1 designates an approximately U-shaped frame disposed horizontally and constructed of resilient material and consisting of an upper bearing-plate 2 and a lower spring 3. The bearing-plate or upper portion of the U-shaped resilient frame extends beneath the axle 4 and is perforated for the reception of the sides of an axle-clip 5, which is provided with nuts 6 for engaging the lower face of the bearing-plate. The front portion of the bearing-plate is extended in advance of the axle and is enlarged and forked or bifurcated, the sides of the fork or bifurcation being bent upward and rearward, forming a pair of hooks 7 and providing bearings for the reception of a coupling or pivot bolt 8 for connecting a thill 9 or a pole to the bearing-plate. The eye 10 of the coupling-iron 11 of the pole 9 is arranged in the space between the bearings and the bolt, which is of the ordinary construction, and is received within the hooks 7, which constitute the bearings of the plate or upper portion 2.

The pivot is retained in the bearings of the upper portion or plate 2 by means of an upright bar or lever 12, extending upward through the fork or bifurcation of the front portion of the said plate 2 and fulcrumed against the back thereof and provided with a hook-shaped upper end 13, extending over the rear portion of the eye of the coupling or thill iron 11 and firmly engaging the same when the parts are locked. The lower portion of the bar or lever 12 is forked to provide two sides 14, which straddle the lower portion or spring 3 and which terminate in eyes for the reception of a pivot 16, passing through the said eyes 15 and through an operating-lever 17. The operating-lever, which is approximately L-shaped, is perforated at its angle for the reception of the pivot 16, and it has a short arm 18, which is forked and pivoted by a fastening device 19 to the end 20 of the spring. The end 20 of the spring, which is slightly thinner than the upper or bearing portion 2, is arranged in the bifurcation of the short arm of the lever, and when the latter is swung rearward to the position illustrated in Fig. 3 of the accompanying drawings the lower portion of the upright bar or lever 12 is carried rearward beyond the end of the spring, and the long arm of the operating-lever 17 extends longitudinally of the spring and bears against the lower face of the same. The spring is slightly compressed by this action, and it serves to hold the upper portion of the bar or lever 12 firmly in engagement with the eye of the thill or coupling iron. When it is desired to change from poles to thills, or vice versa, the handle portion of the lever 17 is swung downward and forward to arrange the parts as shown in Fig. 2, and it will be apparent that the operation of coupling and uncoupling may be quickly performed without the use of a wrench or other tool.

It will be seen that the device is exceedingly simple and inexpensive in construction, that it possesses great strength and durability, and that it may be readily applied to vehicles without necessitating any change in the construction of the thill or coupling irons of poles and thills, as an ordinary bolt is utilized and is arranged in such eyes. The nut of such a bolt may be riveted, so that there is no liability of the pivot accidentally leaving the eye of a pole or thill, and it will also be clear that the operation of coupling and uncoupling may be rapidly performed, so that a vehicle may be quickly changed from a pole to thills, and, vice versa, that all noise and rattling are effectually prevented.

What is claimed is—

1. A device of the class described comprising a bearing-plate having its front portion forked or bifurcated and provided at opposite sides with open bearings, said bearing-plate being also provided with a lower spring, a coupling-iron having a pivot arranged in the bearings, an upright bar or lever passing through the fork or bifurcation at the back thereof and engaging the thill or coupling iron, to retain the same in the open bearings and to prevent the said iron from rattling, and an operating-lever connected with the spring and with the upright bar or lever, substantially as and for the purpose described.

2. A device of the class described comprising a bearing-plate having its front portion forked or bifurcated and provided at opposite sides with open bearings, said bearing-plate being also provided with a lower spring, a coupling-iron having an eye arranged in the front portion of the fork or bifurcation, a pivot-bolt passing through the said eye and arranged in the said bearings, an upright bar or lever passing through the fork or bifurcation at the back thereof and having a hook-shaped upper portion for engaging the said eye to retain the bolt in the open bearings and to prevent the same from rattling, and a lever connecting the lower portion of the upright bar or lever with the said spring, substantially as described.

3. A device of the class described comprising an approximately U-shaped frame arranged horizontally and constructed of resilient material, the upper portion of the frame being provided with open bearings and its lower portion constituting a spring, a coupling-iron having a pivot arranged in the said bearings, and an upright bar or lever engaging the coupling-iron and connected with the spring, substantially as described.

4. A device of the class described comprising an approximately U-shaped frame having its upper portion forked, the sides of the fork being provided with open bearings, a coupling-iron having a pivot, an upright bar or lever passing through the fork or bifurcation at the back thereof and engaging the coupling-iron, and a lever connecting the upright bar or lever with the spring, substantially as described.

5. A device of the class described comprising a substantially U-shaped frame having its upper portion forked and provided with open bearings, a coupling-iron having a pivot arranged in the bearings, an upright bar or lever passing through the fork and engaging the coupling-iron, the lower portion of the upright bar or lever being forked to straddle the lower portion of the frame, and a substantially L-shaped lever pivoted within the fork of the upright bar or lever and connected with the spring, substantially as described.

6. A device of the class described comprising an approximately U-shaped frame provided at its upper portion with open bearings and having its lower portion constituting a spring, a coupling-iron having a pivot arranged in the bearings, and a device connected with the spring and engaging the coupling-iron to retain the pivot in the bearing, substantially as described.

In testimony that I claim the foregoing as my own I have hereto affixed my signature in the presence of two witnesses.

WILLIAM A. HILL.

Witnesses:
H. E. CARY,
J. M. RUDDELL.